L. S. HOPKINS.
CONSTANT SPEED DRIVING DEVICE.
APPLICATION FILED JAN. 5, 1916.
1,241,117.
Patented Sept. 25, 1917.
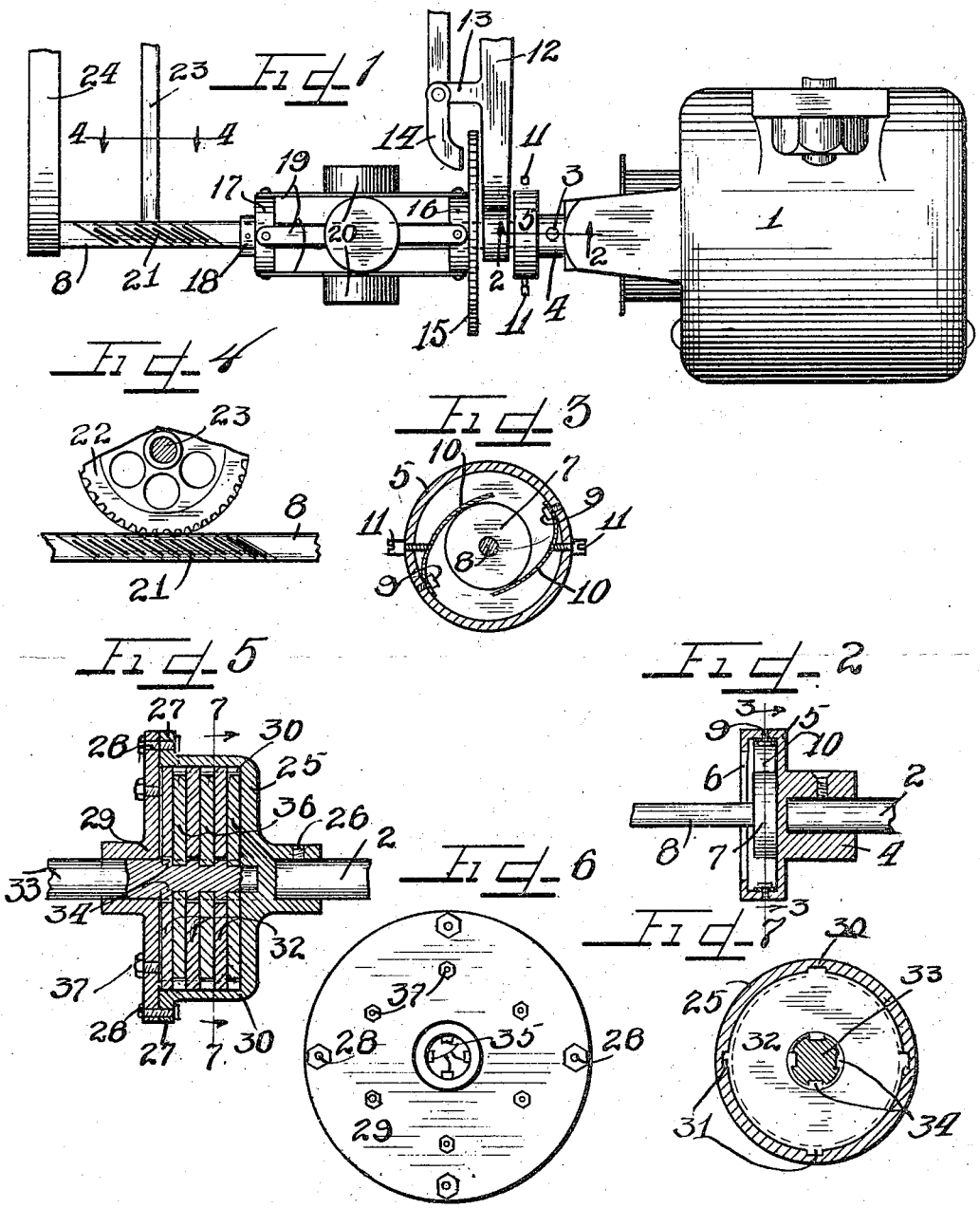

UNITED STATES PATENT OFFICE.

LUTHER S. HOPKINS, OF DUBUQUE, IOWA.

CONSTANT-SPEED DRIVING DEVICE.

1,241,117.  Specification of Letters Patent.  Patented Sept. 25, 1917.

Application filed January 5, 1916. Serial No. 70,361.

*To all whom it may concern:*

Be it known that I, LUTHER S. HOPKINS, a citizen of the United States, and a resident of the city of Dubuque, in the county of Dubuque and State of Iowa, have invented certain new and useful Improvements in Constant-Speed Driving Devices; and I do hereby declare that the following is a full, clear, and exact description of the same, reference being had to the accompanying drawings, and to the numerals of reference marked thereon, which form a part of this specification.

In small rotary devices driven by electric motors, and particularly in machines such as graphophones, dictaphones, and the like, there may be and usually is considerable variation in the speed in the driving shaft of the motor which, of course, is imparted to the rotating disk or cylinder of the machine. This variation in speed is an objectionable feature in the playing of records and is not eliminated by the usual governor of the graphophone which only compensates for the different loads or resistances to be overcome according to the particular character of the record.

This invention relates to a constant speed driving device adapted to be connected between a driving shaft and a driven shaft to prevent the variations in speed being imparted from the driving to the driven shaft, thus providing a constant speed for any purpose whatsoever.

It is an object of this invention to construct a constant speed driving device adapted to be connected between the driving shaft of a motor and a shaft driven thereby to prevent variations in speed thereof being imparted to the driven shaft.

It is also an object of this invention to provide a combination of governor and adjustable friction driving device, the latter connected between the driving shaft of a motor and the driven jack shaft of a graphophone, or similar device, and the former connected on the driven shaft to insure a constant speed of drive to the driven shaft permitting the governor to care for possible irregularities in speed of the driven shaft due to variations in load thereon.

It is further an object of this invention to construct a device comprising members capable of relative movement frictionally engaged with one another adapted to be connected between the shaft of a motor and a driven shaft to limit the drive imparted to the driven shaft to a constant speed.

It is furthermore an object of this invention to construct a device comprising a cup member adapted to be removably secured upon the shaft of a motor, said cup having adjustable friction members therein adapted to drive another shaft by bearing slidably upon a friction element thereon to insure a constant speed of rotation of the driven shaft.

It is also an important object of this invention to construct a constant speed driving combination comprising frictional means having sliding or slipping contact with a friction element whereby fluctuations in speed of the friction means is negatived by the slipping thereof upon the friction element, so that the latter is driven only at a constant predetermined speed irrespective of the speed of the driving friction means.

It is finally an object of this invention to construct a constant speed adjustable friction driving device, for phonographs and similar machines, simple and inexpensive in construction adapted to be mounted upon the driving shaft of an electric motor to drive the driven shaft of a machine by friction.

The invention (in a preferred form) is illustrated in the drawings and hereinafter more fully described.

In the drawings:

Figure 1 is a top plan view of a motor and a part of the driven mechanism of a machine illustrating the use of a device embodying the principles of my invention.

Fig. 2 is a section of the device on line 2—2 of Fig. 1, with parts omitted and with parts shown in elevation.

Fig. 3 is a section on line 3—3 of Fig. 2, with parts shown in elevation.

Fig. 4 is a fragmentary section on line 4—4 of Fig. 1.

Fig. 5 is a vertical section through a modified form of the device.

Fig. 6 is a front exterior view thereof, with the shaft removed.

Fig. 7 is a section on line 7—7 of Fig. 5.

As shown in the drawings:

The reference numeral 1, designates an electric motor provided with a driving shaft 2, upon one end of which is removably connected by means of a screw 3, a part of a constant speed driving device comprising a hub 4, having a cylindrical cup or casing 5, integrally formed on the outer end thereof. Said casing is provided with a large circular opening 6, to permit a friction disk or plate 7, to be inserted into the casing 5. Said disk 7, is integrally formed on or rigidly secured to the end of a driven shaft 8, of a graphophone or other similar machine of any of the familiar types in common use. Removably secured by means of screws 9, on the inner cylindrical wall of the casing 5, in opposite relation to one another are resilient metal springs or friction members 10, bent inwardly to contact the plate 7, as clearly shown in Fig. 3. Threaded through opposite sides of the casing 5, are adjusting screws 11, the inner ends of which respectively contact said springs 10, to impel and hold the same frictionally against the periphery of the disk 7.

Said shaft 8, is journaled in a bracket 12, adjacent the casing 5, on which is integrally formed an arm 13, affording a pivotal support for a friction brake lever 14, the lower end of which is curved or bent inwardly toward the bracket 12, and is adapted to bear against a slidable disk 15. Said disk forms a part of a governer mounted upon the shaft 8, adjacent the bracket 12, and is provided with an integral boss or hub 16. A collar 17, having a hub extension 18, is rigidly secured upon the shaft 8, and the hub 16, and collar are connected together by a plurality of resilient metal straps 19, each of which has secured at the middle thereof a weight 20. Said shaft 8, is provided with a worm 21, adapted to drive a worm gear 22, mounted upon the lower end of a vertical shaft 23, adapted to drive any suitable mechanism. The inner end of the shaft 8, is journaled in a bearing bracket 24, which may be supported in any suitable manner.

Figs. 5, 6 and 7, illustrate a modified form of the device which consists of a short cylindrical casing 25, secured to the shaft 2, by means of a screw 26, or other suitable means. Said casing 25, has integrally formed thereon at its open end an outwardly directed flange 27, having apertures therein to receive bolts 28, for removably securing a cover plate 29, upon said casing. On the inner surface of the casing 25, are a plurality of longitudinally disposed slots or grooves 30, adapted to receive projections 31, formed on the outer periphery of friction disks or plates 32, inserted within the casing to cause the disks to rotate with said casing 25. Mounted in the casing 25, and extending through the cover plate 29, with its inner end of reduced diameter and bearing in a recess in the back wall of said casing 25, is a shaft 33. Said shaft is provided with a plurality of oppositely disposed longitudinal grooves 34, adapted to receive projections 35, formed on the inner periphery of centrally apertured friction disks or plates 36, which are removably mounted upon the shaft 33, in alternate relation with the friction plates 32, as clearly shown in Fig. 5. Threaded through the cover plate 29, and equidistantly spaced from one another are a plurality of adjusting bolts 37, which extend through said cover plate to contact the first friction plate 32, which is adjacent the inner surface of the cover plate 29, for the purpose of transmitting a thrust through said friction disks causing a greater or less frictional engagement therebetween as the case may be.

The operation is as follows:

When it is desired to provide a constant speed for a graphophone or other similar type of machine which is driven by an electric motor, the constant speed driving device is rigidly secured upon the end of the motor shaft 2, by means of the set screw 3, as shown in Fig. 1. The friction plate 7, which is formed on or rigidly secured to the end of the shaft 8, is then inserted through the opening 6, of the casing 5, until the disk 7, is frictionally engaged between the springs 10, which bear upon its periphery. The motor 1, may now be started, and the casing 5, rotating with the shaft 2, due to the frictional engagement of the springs 10, upon the disk 7, the shaft 8, of the graphophone is also rotated, and necessarily only at a constant speed. This is due to the fact that variations in the speed of the motor cause the resilient friction springs 10, to slip over the periphery of the disk either to a greater or less extent as the case may be. By means of the adjusting screws 11, the degree of friction of the springs 10, upon the plate 7, may be increased or decreased to change the particular or predetermined speed of the shaft 8, as desired. With the rotation of shaft 8, the worm 21, and worm gear 22, are actuated to rotate the shaft 23, which drives the record disk or mandrel, not shown in the drawings. By the operation of the weights 20, of the governor, which swing outwardly due to centrifugal force by the rotation of the shaft 8, the governor disk 15, is drawn toward the brake lever 14, to regulate the speed variations which may be caused by changes in load such as differences in the character of the sound waves formed in the record played.

In the modified form of the device shown in Figs. 5, 6 and 7, the casing 25, is removably secured upon the motor shaft 2, and, as shown, in Fig. 5, the friction plates 32 and 36, are alternately arranged, and engaged in the respective grooves 30 and 34. The adjusting bolts 37, may be threaded inwardly against the first plate 32, to increase or decrease the friction between the plates and consequently the speed of rotation of the driven plates.

It will, of course, be understood that the constant speed driving device herein described in connection with the mechanism of a graphophone, may be used with other types of mechanism, and it is also obvious that the various details of construction may be varied through a wide range without departing from the principles of this invention. I therefore do not purpose limiting the patent granted otherwise than necessitated by the prior art.

I claim as my invention:

1. In a device of the class described, the combination with a motor shaft, of a casing secured thereon, friction members removably secured on the inner wall of said casing, adjusting members projecting into said casing to contact said friction members, a driven shaft, and friction means thereon contacted by said friction members to cause said shaft to rotate at a predetermined constant speed.

2. In a device of the class described, a casing removably mounted upon a motor shaft, friction members therein, a shaft extending into said casing, friction means thereon adapted to be engaged by said friction members to cause said second mentioned shaft to rotate at a constant speed when said motor shaft is rotated, and adjusting screws projecting into said casing adapted to adjust said members to vary the degree of friction between said friction members and said friction means to change the predetermined speed of rotation of said second mentioned shaft.

3. In a device of the class described, a casing, resilient friction members mounted therein, means disposed within said casing between said friction members adapted to be rotated thereby up to a certain predetermined constant speed, and beyond which slippage occurs, and adjusting means on said casing adapted to vary the amount of friction between said friction members and said means to increase or decrease the predetermined limit of speed of rotation of said means.

4. In a speed limiting driving device of the class described, a driving member, friction bearing members mounted therein, and a disk disposed to receive said members the periphery thereof contacting therewith to be frictionally rotated thereby, and means adapted to vary the amount of friction between said members and said disk to increase or decrease the limiting rate of rotation of said disk.

5. In a driving device of the class described, the combination of a driving shaft and driven shaft, of co-acting friction means secured on said driving and driven shafts, and adjusting screws adapted to vary the frictional engagement between said means to adjust the limiting speed of the driven shaft to different amounts.

6. In a constant speed driving device of the class described, a driving member, resilient members therein, a driven member, said resilient members adapted to normally spring away from said driven member, and adjustable means projecting into said driving members for holding said resilient members in driving contact with said driven member to frictionally rotate the same up to a certain constant speed.

7. In a device of the class described, a casing, a friction disk therein, resilient driving members mounted within said casing in a position to normally spring away from said disk, and means for holding said resilient members in driving contact with said disk to frictionally rotate the same at a predetermined constant speed.

8. In a driving mechanism the combination with a drive and driven shaft, coacting friction members secured on said shafts, means for varying the frictional engagement between said members, and a centrifugal governor on the driven shaft.

9. In a device of the class described, a drive shaft, a friction element driven thereby, a driven shaft, a friction element thereon contacted by and driven from the first named friction element, a slidable friction disk on the driven shaft, a centrifugal governor on the driven shaft connected with the friction disk, and a member adapted to be contacted by the slidable friction disk.

10. In a device of the class described, a friction drive mechanism, means for controlling the friction of the mechanism, and a centrifugal governor mechanism coacting with the friction drive mechanism.

In testimony whereof I have hereunto subscribed my name in the presence of two subscribing witnesses.

LUTHER S. HOPKINS.

Witnesses:
  JOHN E. WAGNER,
  H. E. ESCHEN, Jr.